United States Patent
Zhou et al.

(10) Patent No.: US 8,881,957 B2
(45) Date of Patent: Nov. 11, 2014

(54) RELIEF VALVE

(75) Inventors: Xianzhi Zhou, Guangzhou (CN); Dong Xiao You, Dongguan (CN)

(73) Assignee: Reckitt & Colman (Overseas) Limited, Slough, Berkshire (GB)

( * ) Notice: Subject to any disclaimer, the term of this patent is extended or adjusted under 35 U.S.C. 154(b) by 606 days.

(21) Appl. No.: 13/129,165

(22) PCT Filed: Nov. 16, 2009

(86) PCT No.: PCT/GB2009/002672
§ 371 (c)(1),
(2), (4) Date: Aug. 31, 2011

(87) PCT Pub. No.: WO2010/055309
PCT Pub. Date: May 20, 2010

(65) Prior Publication Data
US 2012/0118430 A1 May 17, 2012
US 2012/0261030 A2 Oct. 18, 2012

(30) Foreign Application Priority Data

Nov. 17, 2008 (GB) .................................. 0820978.5

(51) Int. Cl.
| | |
|---|---|
| *B65B 3/18* | (2006.01) |
| *B65D 90/22* | (2006.01) |
| *B65D 51/16* | (2006.01) |
| *F16K 17/08* | (2006.01) |
| *F16K 15/14* | (2006.01) |

(52) U.S. Cl.
CPC ............ *B65D 51/165* (2013.01); *F16K 17/085* (2013.01); *B65D 2205/00* (2013.01); *F16K 15/145* (2013.01); *F16K 17/087* (2013.01)
USPC ........ 222/481.5; 222/325; 222/380; 137/526; 137/859

(58) Field of Classification Search
CPC B65D 51/165; B65D 2205/00; F16K 17/085; F16K 17/087; F16K 15/145
USPC ................ 222/325, 380, 481.5; 137/526, 859
See application file for complete search history.

(56) References Cited

U.S. PATENT DOCUMENTS 3,527,551 A * 9/1970 Kutik et al. .................... 417/560
7,302,962 B2 * 12/2007 Blake et al. ................ 137/15.18

FOREIGN PATENT DOCUMENTS

EP 1714592 * 10/2006 ............. A47G 19/22

* cited by examiner

*Primary Examiner* — J. Casimer Jacyna
(74) *Attorney, Agent, or Firm* — Troutman Sanders LLP; Ryan A. Schneider; Troy S. Kleckley

(57) ABSTRACT

A relief valve (60) for a liquid container, the valve comprising a substantially conical body (50) extending into the container, and tapering inwardly away from an external wall of the container, at least one air inlet passage (62) through the substantially conical body; and a flexible diaphragm (53) extending over the conical body, being attached at its outer periphery around the substantially conical body and having a central opening surrounding the substantially conical body above the air inlet passage so as to seal the air inlet passage until the pressure within the container falls below a predetermined level.

5 Claims, 10 Drawing Sheets

RELIEF VALVE

CROSS-REFERENCE TO RELATED APPLICATIONS

This application is a US National Stage of International Application No. PCT/GB2009/002672, filed 16 Nov. 2009, which claims the benefit of GB 0820978.5, filed 17 Nov. 2008, both herein fully incorporated by reference.

FIELD OF THE INVENTION

The present invention is directed to a relief valve.

BRIEF SUMMARY OF THE INVENTION

In particular, the invention is directed to a relief valve for a dispenser which dispenses liquid soap or the like. In such a dispenser, as the liquid is dispensed from the container, the pressure within the container drops. Once the pressure drops below a certain level, air would be drawn in through the liquid outlet, thereby interfering with the outlet flow.

To prevent this, a separate pressure relief valve is provided to allow air into the container once the pressure within the container drops below a certain level.

It is known to make such check valves from an elastomeric material with a slit. Such a valve is disclosed in WO 00/27746. The relief valve is intended to be used with the container in an inverted configuration. It is convenient for the relief valve to be in the cap of the container as the main part of the container is a simple molding without complex parts. However, in an inverted configuration, the weight of the liquid bears on the relief valve if it is within the cap. A slit elastomeric valve therefore has to be robust enough to withstand this, but, at the same time, must be able to open reliably when the pressure within the container drops below a certain level.

The present invention aims to provide a pressure relief valve that can operate well in the cap of a container when the container is in an inverted configuration with the cap lowermost. At the same time, the valve should be simple in structure and suited to mass production.

According to the present invention, there is provided a relief valve for a liquid container, the valve comprising a substantially conical body extending into the container, and tapering inwardly away from an external wall of the container, at least one air inlet passage through the substantially conical body; and a flexible diaphragm extending over the conical body, being attached at its outer periphery around the substantially conical body and having a central opening surrounding the substantially conical body above the air inlet passage so as to seal the air inlet passage until the pressure within the container falls below a predetermined level.

The substantially conical body with the air inlet passage can simply be part of the molding of the underlying container. All that is then required is the flexible diaphragm which can readily be fitted in place.

The conical body supports the diaphragm, and the weight of the liquid in the container only serves to enhance the seal under normal circumstances. Because of the underlying support, the diaphragm material can be made very thin as the material itself does not need to support the weight of the liquid without buckling. This thin diaphragm layer is then readily displaceable by the incoming air when the pressure within the container drops.

The diaphragm may seal against the wall of the conical body itself. In this case, if the angle of inclination of the diaphragm is less than the angle of inclination of the conical body, this creates a natural biasing force to hold the diaphragm on the body.

However, preferably, a cylindrical post is upstanding from the conical body and the central opening in the flexible diaphragm is a tight fit against the post to form the seal. This forms a more positive and more easily repeatable seal than sealing against the conical body itself.

The relief valve is preferably applied to a container having a cap and a bottle, the container having an outlet in the cap and being arranged to dispense liquid from the container when in an inverted configuration, the relief valve being in the cap.

Preferably, the liquid container has an outlet valve to control the flow of liquid out of the container. In this case, the flexible diaphragm is preferably integral with the outlet valve. If the outlet valve is resiliently biased by biasing elements these are also preferably integral with the diaphragm and the outlet valve. This simplifies the structure of the relief valve as the flexible diaphragm can effectively be molded into an existing component rather than being a separate component in its own right.

As mentioned above, the relief valve is designed to prevent air from entering through a liquid outlet, as this disrupts the liquid flow and does not dispense the desired dose. A refill unit for dispensing a liquid designed to be used in a inverted configuration, with the outlet at its lowermost end, will typically comprise a bottle forming the main body of the unit with a cap at its lowermost end. In such a unit, it is desirable to place the outlet and the relief valve in the cap. This allows the bottle to be formed as a simple molding such as a blow molding, while the cap can be a more complex molding comprising a number of pieces. However, this brings the relief valve into close proximity to the outlet thereby reintroducing the possibility of incoming air being entrained in the outgoing liquid and disrupting the flow. This imposes limitations on the placing of the outlet and relief valve and also means that the diameter of the cap must be reasonably large in order to provide adequate separation between the outlet and the relief valve.

According to a second aspect of the present invention, a refill unit for a dispenser has a cap at one end which, in use, is the lowermost end, an outlet in the cap with an outlet valve and associated valve seat for allowing selective dispensing of liquid from the unit, a pressure relief valve within the cap for allowing air to enter the unit if the internal pressure drops below a certain level, and a shroud in the form of a wall surrounding at least the side of the pressure relief valve facing the outlet and extending to a location above the valve seat when the unit is in its usual orientation with the cap at the lowermost end.

The shroud prevents there being a direct path for the incoming air to the liquid outlet, thereby allowing the relief valve to be positioned closer to the outlet valve. This allows greater flexibility of the positioning of the relief valve and the outlet, and allows the cap to be reduced in size.

There may be a single relief valve, or there may be more than one relief valve. If there is more than one relief valve, each pressure relief valve is associated with a shroud in the form of a wall surrounding at least the side of the pressure relief valve facing the outlet and extending to a location above the valve seat when the unit is in its usual orientation with the cap at the lowermost end.

The pressure relief valve preferably comprises a resilient component which is deformable when the internal pressure drops below the certain level, the resilient component being attached to the cap by being sandwiched between the cap and a fixing plate, wherein the shroud is provided in the fixing plate.

The resilient component is preferably integral with the outlet valve. The outlet valve may be biased by biasing elements, which may also be integral with the outlet valve and resilient component.

BRIEF DESCRIPTION OF THE DRAWINGS

A relief valve in accordance with the present invention will now be described with reference to the accompanying drawings, in which.

DETAILED DESCRIPTION OF PREFERRED EMBODIMENTS

The dispenser is a hands-free dispenser which is generally suitable for domestic use. The dispenser is primarily intended to dispense liquid soap, but may also be used to dispense other liquid or semi-liquid products (ideally with a viscosity greater than water), such as hand cream, body lotion, moisturiser, face cream, shampoo, shower gel, foaming hand wash, shaving cream, washing up liquid, toothpaste or a sanitising agent such as alcohol gel.

Figure 1:
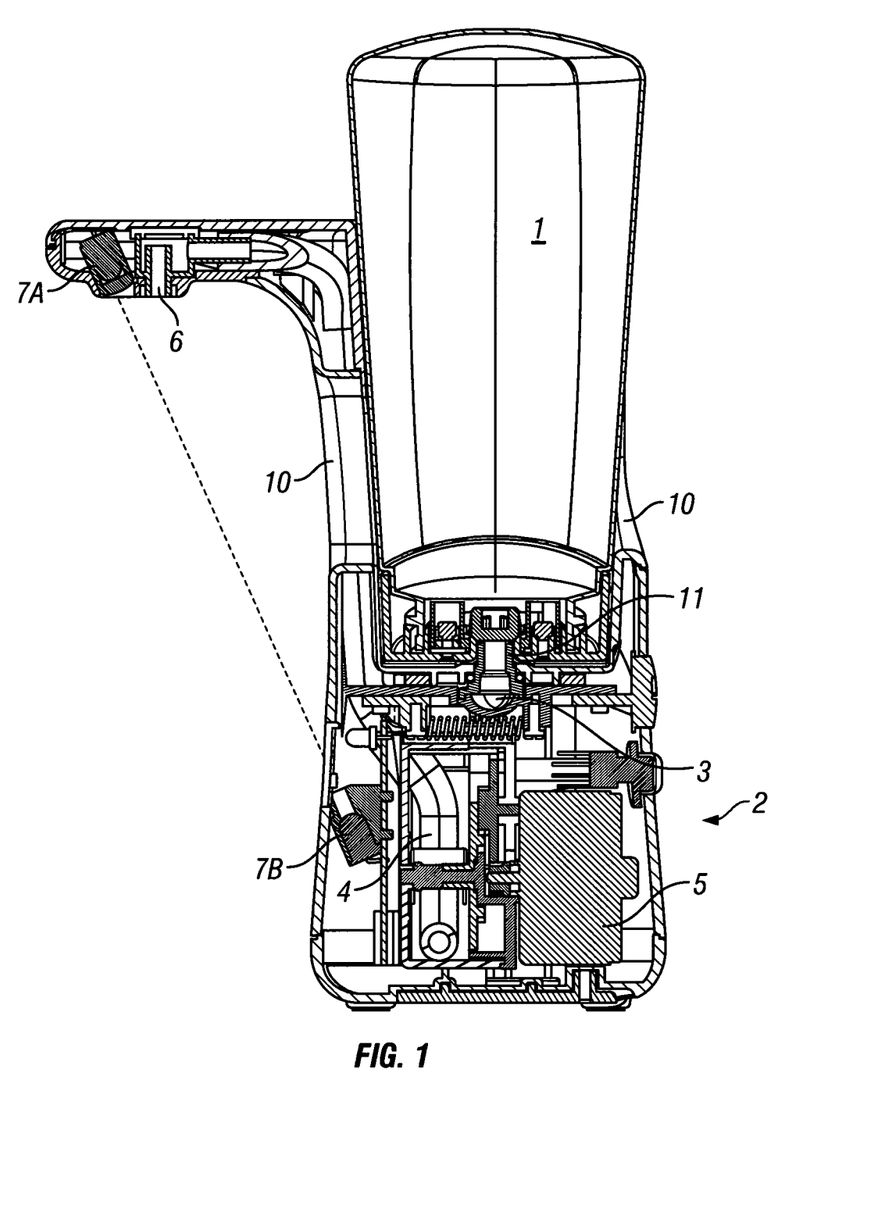
FIG. 1 is a cross-section through a dispenser.

The dispenser comprises two main parts, namely a refill 1 and a base unit 2. The refill 1 provides a reservoir of liquid to be dispensed and is fitted to the base unit 2 as set out below.

The base has an interface 3 into which liquid is dispensed from the refill unit. The interface 3 is in fluid communication with a dispensing tube 4. A pump 5 is selectively operable to pump a metered dose of the liquid along dispensing tube 4 and out of dispensing head 6.

The base has an infrared transmitter 7A which transmits an infrared beam through a window 8 to a receiver 7B to sense the presence of a user's hands in the vicinity of the dispenser. Control circuitry reacts to a signal from the proximity sensor to activate the pump. The illustrated sensor is a break beam sensor, but may also be a reflective sensor. Although an infrared sensor is shown, any known proximity sensor such as a capacitive sensor may be used. The device may be mains powered or battery powered. Alternatively, it may be a manually operated pump device in which a user pushes a lever to displace the product.

The interface between the refill 1 and base unit 2 will now be described in greater detail with reference to FIGS. 2 to 10.

Figure 2:
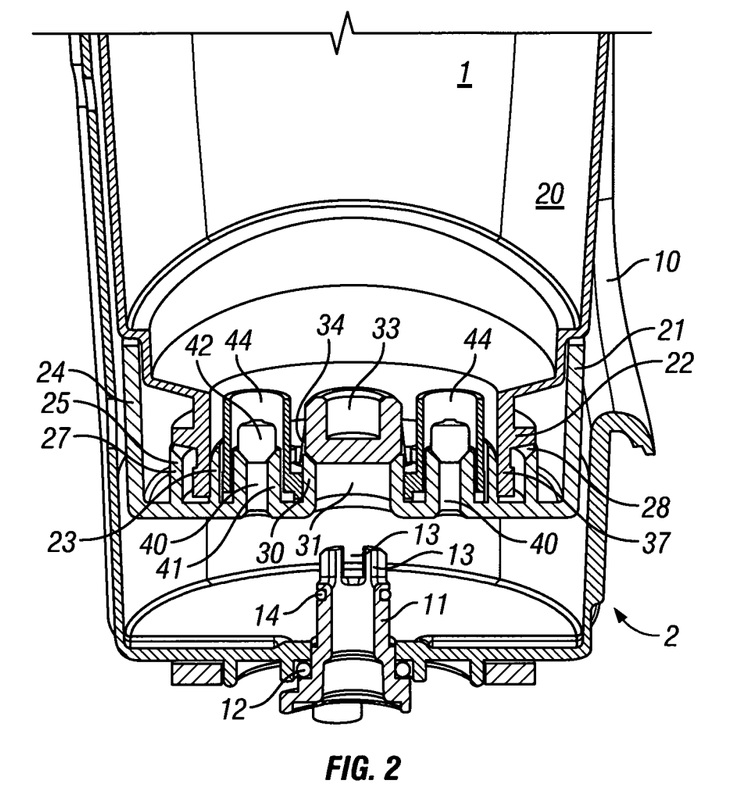
FIG. 2 is a cut-away perspective view of the refill being introduced into the dispenser but not yet being engaged, the refill having a relief valve which is not in accordance with the present invention.

The base unit 2 comprises a cowling 10 which forms a cup-shaped housing surrounding a significant portion of the refill to protect and support it. A spigot 11 projects through the base of the cowling 10 and is sealed to the cowling 10 by an O-ring seal 12. The spigot has a plurality of castellations 13 in its top surface. A second O-ring seal 14 surrounds the spigot 11 beneath the castellations 13.

The refill 1 comprises a bottle 20 to which a cap 21 is fixed. The bottle 20 has a neck 22 which fits over and seals with an annular flange 23 within the cap 21. The cap 21 has an upwardly depending skirt 24 (when in the inverted orientation shown in the drawings) which forms the outer surface of the cap. Working inwardly from the skirt 24, the next feature of the cap is an outer annular wall 25 which is generally co-axial with the skirt 24.

This is shown in detail in FIGS. 5 to 10.

Figure 5:
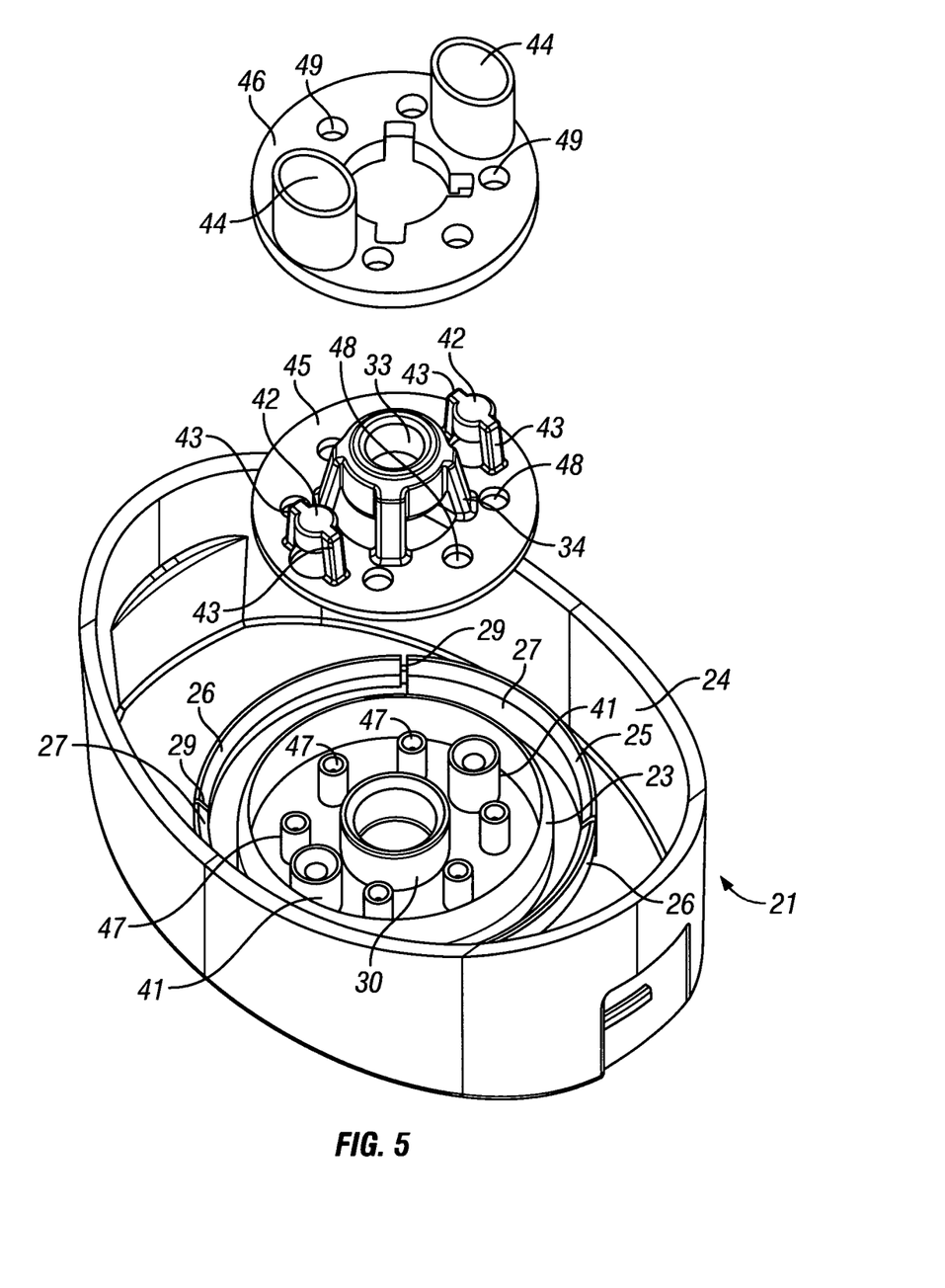
FIG. 5 is a perspective view of the cap assembly prior to assembly.
Figure 6:
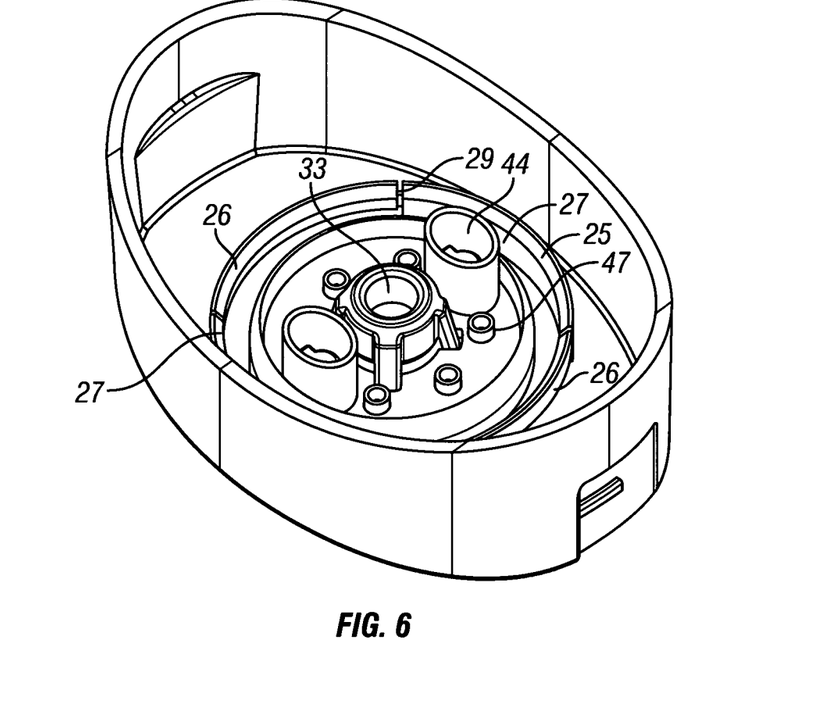
FIG. 6 is a perspective view of the cap assembly after assembly.
Figure 7:
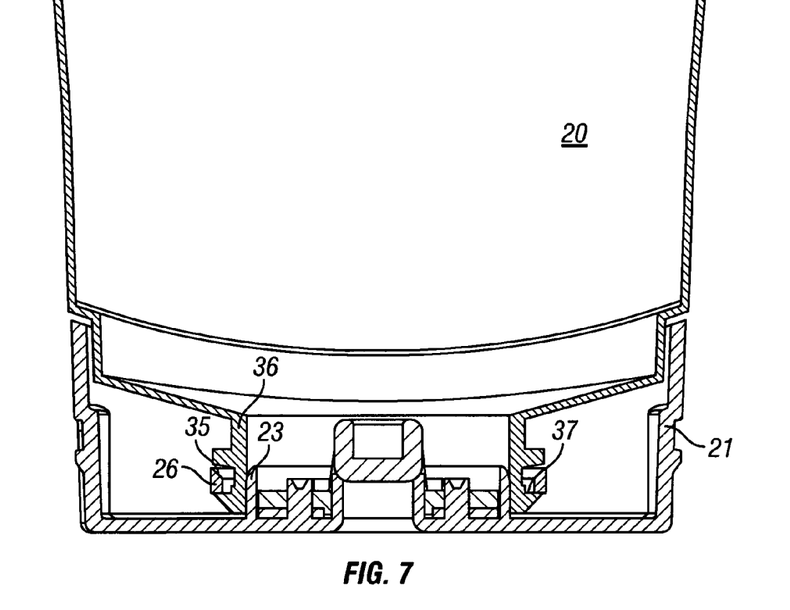
FIG. 7 is a cross-section showing the engagement between the bottle neck and cap assembly.
Figure 8:
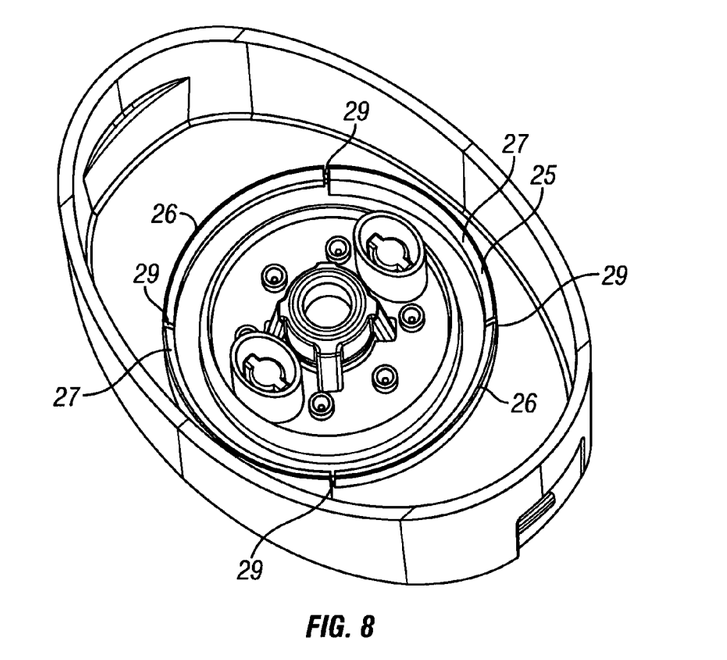
FIG. 8 is a perspective view of the cap with the frangible members intact.
Figure 9:
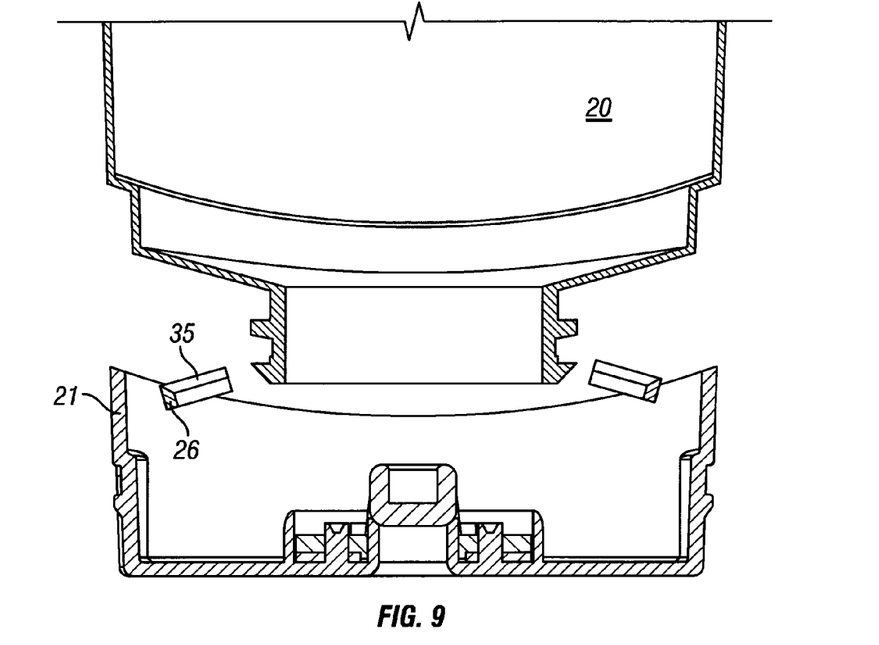
FIG. 9 is a view similar to FIG. 7 after the bottle has been removed from the cap.

The outer annular wall 25 consists of a pair of retaining members 26 and a pair of support members 27 which alternate with one another and each extend for approximately a quarter of the circle as shown in FIGS. 5, 6, 8 and 10. The profile of the support members 27 is as shown in FIG. 2. These members extend directly up from the lower wall of the cap, are parallel sided and have an inclined upper surface 28. The profile of the retaining members 26 is shown in FIGS. 7 and 9. Unlike the support members 27, these are not fixed to the wall of the cap. Instead, they are fixed at either end to the support members 27 by frangible members 29 as best shown in FIGS. 6 and 8. The retaining members 26 are parallel sided and have an inclined upper surface 35 as shown in FIGS. 7 and 9.

As shown in FIGS. 7 and 9, the neck 22 of the bottle has an inclined outer surface 36 which is complimentary to the inclined surfaces 28 and 35 of the annular wall 25. Behind the inclined outer surface 36 is a shoulder 37 which faces the main body of the bottle 20. This inclined outer surface 36 and shoulder 37 is only present in the vicinity of the retaining members 26 and not in the vicinity of the support members 27. Adjacent to the support members 27, the neck 22 has a parallel sided configuration as shown in FIG. 2.

Figure 10:
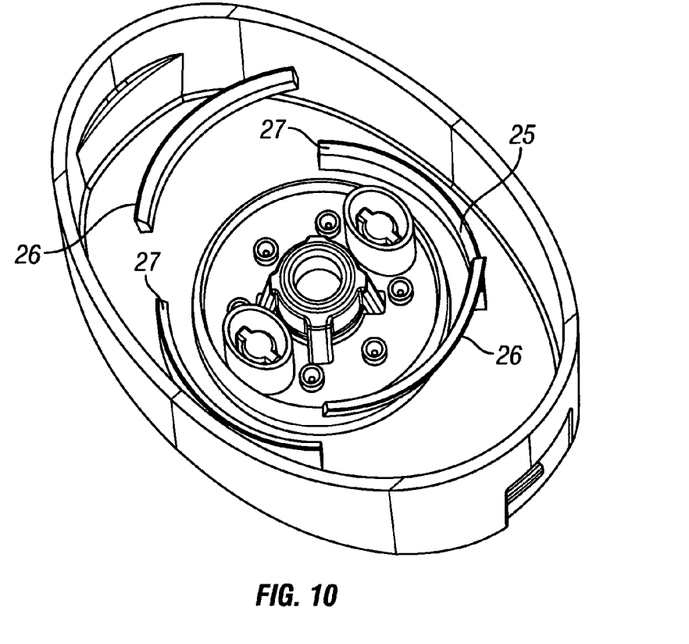
FIG. 10 is a view similar to FIG. 8 after the frangible members have broken off.

In order to insert the bottle 20 into the cap 21, the bottle 20 is pushed down with its neck fitting over the annular flange 23. The inclined outer surface 36 of the bottle co-operates with the inclined surfaces 28, 35 to displace the retaining members 26 radially outwardly until the shoulder 37 snaps into place behind the retaining members 26 as shown in FIG. 7. When the bottle 20 is pulled off of the cap 21, the shoulders 37 bear against the retaining members 26, thereby breaking frangible members 29 so that the retaining members 26 become detached from the cap 21 as shown in FIGS. 9 and 10. Once this has happened, it is no longer possible to retain the cap on a bottle, thereby preventing subsequent use of the refill 1.

It should be noted that it is not necessary for both of the retaining members 26 to become fully detached from the lid. It is possible that only one of these becomes detached, or that one or both are simply displaced to a location at which they can no longer engage with the neck of the bottle.

Returning now to FIGS. 2 to 4, the liquid outlet and associated valve will now be described.

The liquid outlet from the reservoir is provided by an annular wall 30 surrounding a central opening 31. At the top of the annular wall 30 is an inclined surface 32 (see FIG. 4) which provides a valve seat for outlet valve element 33. This is shown in the form of a U-shape cup-like member, but may equally be a solid member or a hollow ball-like member. The outlet valve element 33 is biased into its closed position by a plurality of biasing elements 34. These are attached at their upper end towards the top of the valve element 33 and are attached at their lower ends at a location radially outward of the annular wall 30 and below the top of the annular wall 30. They are preferably formed integrally with the valve element 33.

Figure 3:
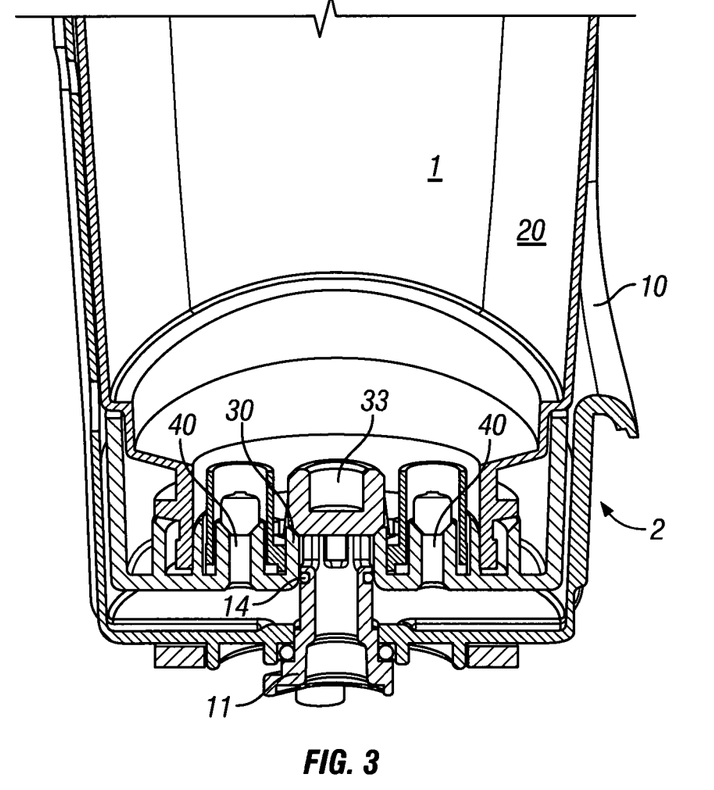
FIG. 3 is a view similar to FIG. 2 showing the refill in an intermediate position.
Figure 4:
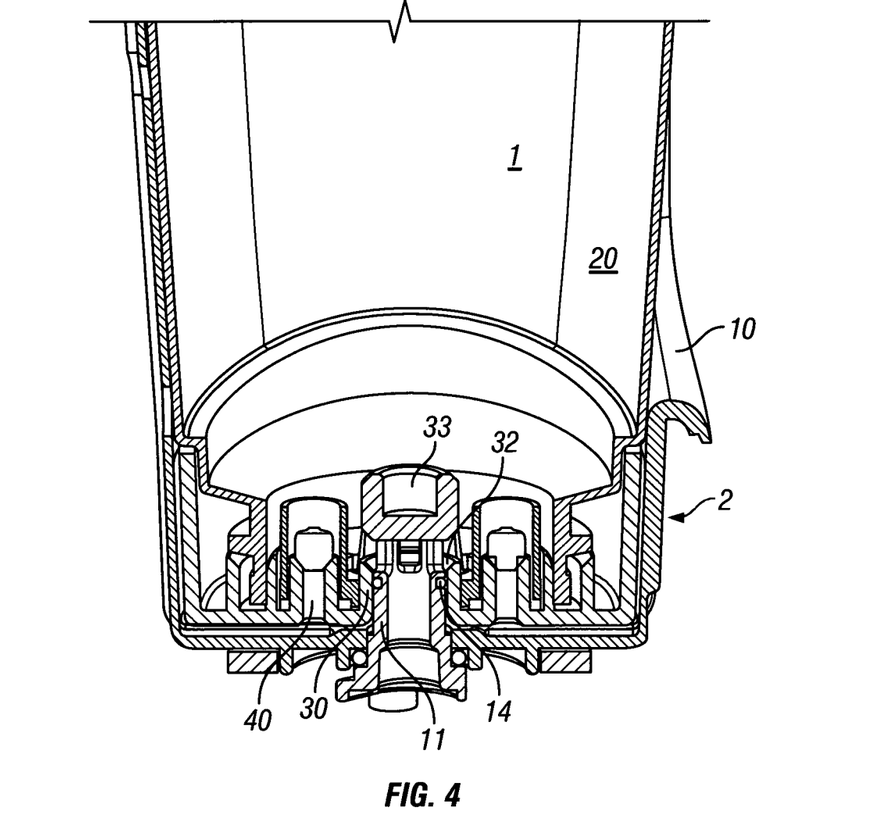
FIG. 4 is a view similar to FIGS. 3 and 4 showing the refill in its fully engaged position.

As shown in FIGS. 2 to 4, when the refill 1 is lowered into the base unit 2, the spigot 11 engages with the lower surface of the valve element 33 as shown in FIG. 3. Further downward movement of the refill causes the valve element 33 to be lifted from its seat, and also brings the O-ring 14 into sealing engagement with the annular wall 30. The valve element 33 is lifted to the position shown in FIG. 4. In this position, liquid in the bottle 20 can flow around the biasing elements 34, and enter the spigot via the castellations 13 and hence flow into the base unit 2. Liquid is prevented from escaping between the spigot 11 and annular wall 30 by the O-ring seal 14. This arrangement offers a simple and mess-free way for a consumer to insert a refill regardless of the fill level of the refill.

In order to remove a refill, the consumer lifts it out of the base whereupon the biasing elements 34 cause the valve element 33 to return to the seat 32. During this movement, the seal between the spigot 11 and annular wall 30 is maintained by the O-ring seal 14. A spent refill is then replaced by a new one following the above procedure.

The cap is provided with a pair of pressure relief valves 40. Each is formed by an annular boss 41 integral with the cap 21. A pressure relief valve element 42 is seated on the top of the annular boss 41 and is biased in place by a pair of biasing elements 43 (as shown, for example, in FIG. 5). The biasing force is such that, under normal conditions, the pressure relief valve element 42 forms an air tight seal on the boss 41. However, when the pressure within the bottle 20 drops below a certain level, the pressure differential across the relief valve element 42 is sufficient to overcome the force exerted by biasing elements 43 and to allow air into the bottle 20. This reduces the pressure differential thereby restoring the air tight seal without leakage of fluid.

Each pressure relief valve 40 is surrounded by an annular barrier 44 which extends axially to a level axially above the level of the top of the annular wall 30. Thus, when the valve element 33 is open, any air entering the relief valve 40 will not become entrained in the outgoing liquid stream. In practice, this means that the relief valve can be placed closer to the outlet, thereby resulting in a more compact cap. Although two relief valves are shown, a single valve, or more than two valves could be provided if necessary.

The manner in which the cap is assembled is illustrated in FIGS. 5 and 6.

The assembly is a three-part structure consisting of the cap 21, a valve plate 45 and a fixing plate 46. The cap has a number of moulded features including the annular flange 23, annular wall 25 and annular bosses 41. In addition, the cap 21 has a plurality of fixing posts 47.

The valve plate 45 is an elastomeric material and is integrally formed with the valve element 33, biasing elements 34, relief valve element 42 and biasing elements 43. The valve plate has a plurality of locating holes 48 which correspond to the fixing posts 47.

The fixing plate 46 is made of a rigid plastics material and is integrally formed with the annular barrier 44. As with the valve plate 45, the fixing plate 46 is also provided with a plurality of locating holes 49 which correspond to the fixing posts 47.

To assemble the cap, the three components are placed on top of one another as shown in FIG. 6 with the fixing posts entering the locating holes to ensure that the components are correctly aligned. Heat or adhesive is then applied to the top of the fixing posts 47 to secure the fixing posts to the fixing plate 46. The elastomeric valve plate 45 is thereby sandwiched between the cap 21 and fixing plate 46 which holds the valve elements 33 and 42 in position.

A second example of a cap for a refill unit will now be described with reference to FIGS. 11 to 14.

The structure of the outlet valve element 33 in the second example is essentially the same as the first example, and will not be described again in relation to the second example.

Figure 11:
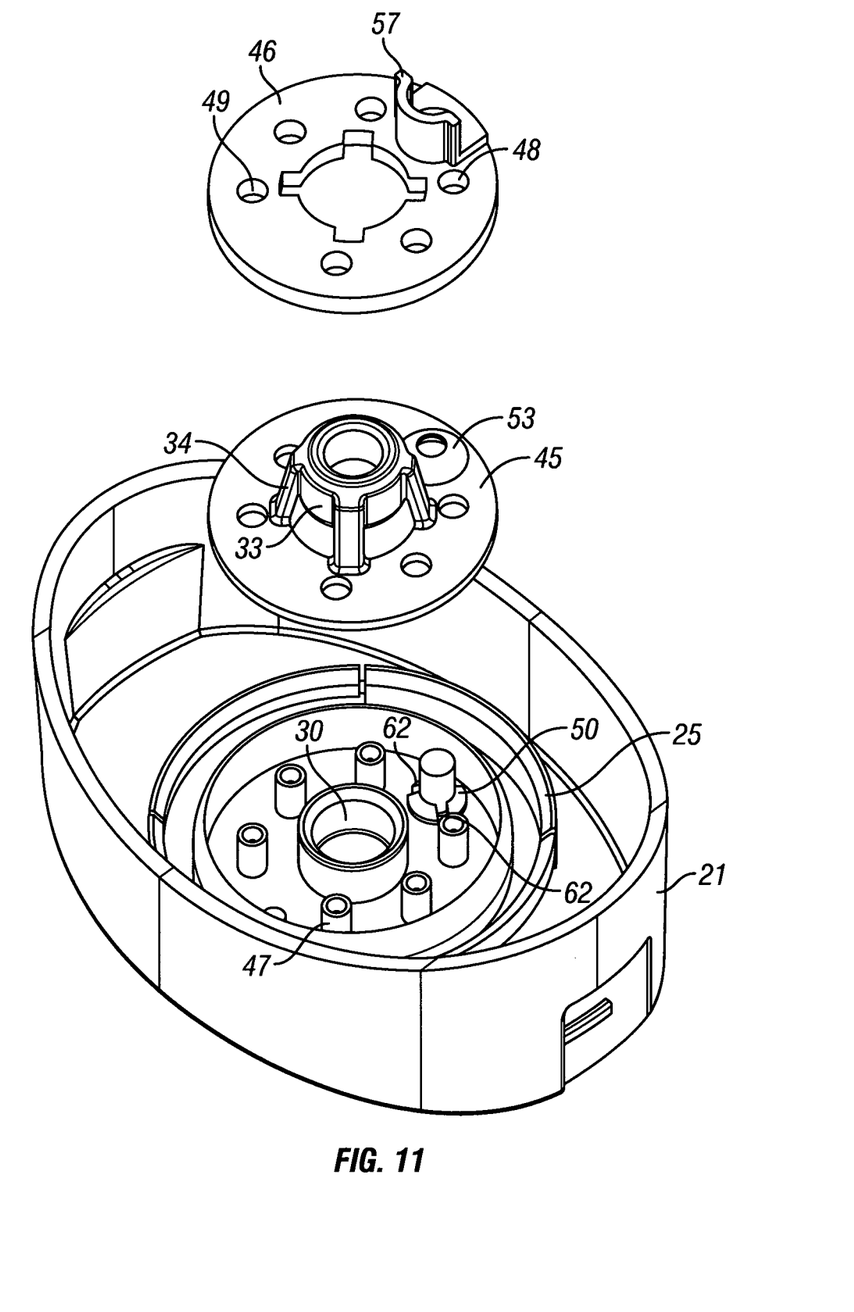
FIG. 11 is an exploded perspective view of a cap of a second refill unit having a relief valve which is in accordance with the present invention.
Figure 12:
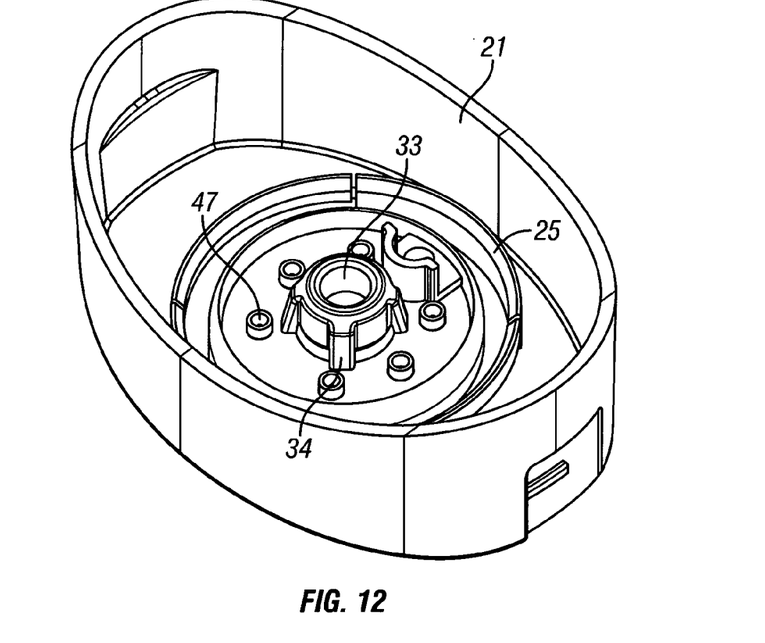
FIG. 12 is a view similar to FIG. 11 showing the assembled cap.

As can be seen from FIG. 11, the cap 21 is integrally molded with a number of features, such as the annular walls 25 and 30 and a conical part 50 of the pressure relief valve which will be described below. A resilient lip 53 (described in more detail below) for the pressure relief valve is provided integrally molded with the valve plate 45. The fixing plate 46 is also provided with a shield 57 for the relief valve. This is equivalent to the barrier 44 in FIG. 2, but only extends around the side of the relief valve facing the outlet valve element 33. The barrier 44 and shield 57 could be used interchangeably in the two examples.

The cap assembly is assembled in the same manner as in the first example.

Figure 13:
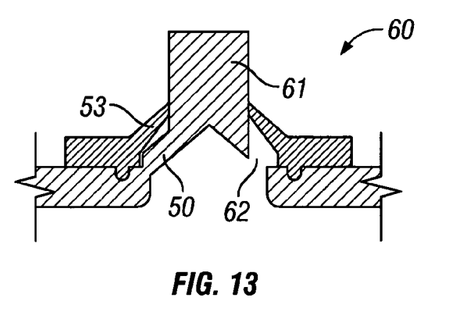
FIG. 13 is a cross-sectional view through the pressure relief valve of the second example.
Figure 14:
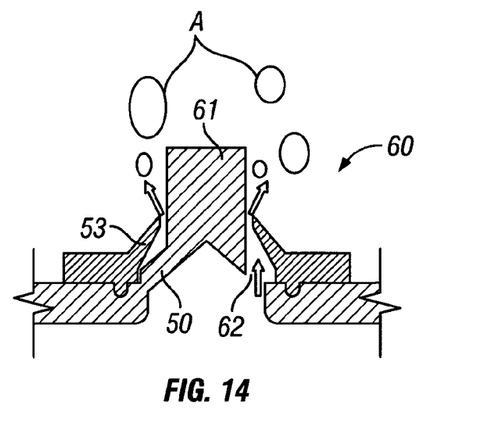
FIG. 14 is a view similar to FIG. 13 showing the pressure relief valve in an open configuration to allow the flow of air.

The pressure relief valve 60 is illustrated in FIGS. 13 and 14.

The valve has the conical part 50 which is an integral part of the cap 21 as mentioned above. At the top of the conical part 50 is a cylindrical post 61. The resilient lip 53 is effectively a hollow frustoconical extension of the valve plate 52 of resilient material which extends along the conical part 50 from which it diverges slightly and is a tight fit against the post 61. At least one air inlet 62 (also shown in FIG. 11) passes through the wall of the conical part 50 and is normally covered by the resilient lip 53 as shown in FIG. 11. When the pressure in the bottle 20 falls as liquid is emptied the pressure differential across the resilient lip 53 will eventually become sufficient to displace the lip 53 to a sufficient degree to allow air A into the bottle 20 as shown by the arrows in FIG. 8. It should be noted that the degree to which the resilient lip 53 lifts from the conical element 50 has been exaggerated in FIG. 8 and that, in practice, this will be almost imperceptible.

Instead of sealing against the post, the resilient lip 53 may seal against the conical part 50. In this case, the lip will not diverge from the conical part as shown. Instead, it would actually have an angle of incline less than the angle of the conical part 50 so as to be naturally biased onto the conical part.

The invention claimed is:

1. A relief valve for a liquid container, the valve comprising:
   a substantially conical body extending into the container, and tapering inwardly away from an external wall of the container, at least one air inlet passage through the substantially conical body;
   a flexible diaphragm extending over the conical body, being attached at its outer periphery around the substantially conical body and having a resilient lip surrounding the substantially conical body above the air inlet passage so as to seal the air inlet passage until the pressure within the container falls below a predetermined level; and a cylindrical post upstanding from the conical body, wherein the resilient lip is a tight fit against the cylindrical post to form the seal; and wherein an annular barrier surrounds at least the side of the relief valve facing a liquid outlet from the container, said annular barrier extending axially to a level above the top of an annular wall surrounding a central opening defining the liquid outlet from the container.

2. A relief valve according to claim 1 further comprising an outlet valve to control the flow of liquid through said liquid outlet and out of the container, the flexible diaphragm being integral with the outlet valve.

3. A relief valve according to claim 2, wherein the outlet valve is resiliently biased by biasing elements which are integral with the diaphragm and outlet valve.

4. A relief valve according to claim 1, wherein the at least one air inlet passage extends through a radial center of the substantially conical body.

5. A relief valve according to claim 1, wherein the at least one air inlet passage extends through a radial center of the substantially conical body from a first end of the substantially conical body proximate the external wall of the container to a second end of the substantially conical body proximate an interior wall of the container.

\* \* \* \* \*